United States Patent
Sanders et al.

(10) Patent No.: US 8,991,683 B2
(45) Date of Patent: Mar. 31, 2015

(54) MARK-OFF SUPPRESSION IN SUPERPLASTIC FORMING AND DIFFUSION BONDING

(75) Inventors: Daniel G. Sanders, Lake Tapps, WA (US); Larry D. Hefti, Auburn, WA (US); Gregory L. Ramsey, Seabeck, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 13/607,905

(22) Filed: Sep. 10, 2012

(65) Prior Publication Data

US 2013/0001276 A1 Jan. 3, 2013

Related U.S. Application Data

(63) Continuation-in-part of application No. 11/393,114, filed on Mar. 30, 2006, now Pat. No. 8,328,075.

(51) Int. Cl.
| | |
|---|---|
| *B23K 20/00* | (2006.01) |
| *B21D 26/02* | (2011.01) |
| *B23K 31/02* | (2006.01) |
| *B21D 26/055* | (2011.01) |
| *B23K 20/02* | (2006.01) |

(52) U.S. Cl.
CPC .............. *B23K 31/02* (2013.01); *B21D 26/055* (2013.01); *B23K 20/023* (2013.01)
USPC ............... 228/193; 228/157; 228/194; 72/60; 72/61; 29/505

(58) Field of Classification Search
USPC .......................... 228/157, 193, 194; 72/60, 61
See application file for complete search history.

(56) References Cited

U.S. PATENT DOCUMENTS

| | | | |
|---|---|---|---|
| 3,807,032 A | 4/1974 | Nilsson | |
| 3,927,817 A * | 12/1975 | Hamilton et al. | 228/157 |
| 4,304,350 A | 12/1981 | Paez et al. | |
| 4,331,284 A | 5/1982 | Schulz et al. | |
| 4,354,369 A * | 10/1982 | Hamilton | 72/38 |
| 4,426,032 A | 1/1984 | Leodolter | |
| 4,534,196 A | 8/1985 | Kiyoto et al. | |
| 4,603,808 A | 8/1986 | Stacher | |
| 5,115,963 A * | 5/1992 | Yasui | 228/157 |
| 5,214,948 A * | 6/1993 | Sanders et al. | 72/58 |
| 5,240,376 A | 8/1993 | Velicki | |
| 5,275,325 A | 1/1994 | Stracquadaini | |
| 5,284,288 A | 2/1994 | Woodward | |
| 5,384,959 A | 1/1995 | Velicki | |
| 5,401,583 A | 3/1995 | Stacher et al. | |
| 5,689,987 A * | 11/1997 | Yasui | 72/60 |
| 5,692,406 A * | 12/1997 | Yasui | 72/60 |
| 5,890,285 A | 4/1999 | Pruitt et al. | |
| 6,138,898 A | 10/2000 | Will et al. | |

(Continued)

FOREIGN PATENT DOCUMENTS

EP 00194827 5/1989

*Primary Examiner* — Devang R Patel
(74) *Attorney, Agent, or Firm* — The Small Patent Law Group, LLC

(57) ABSTRACT

A method of forming a pack in a die by superplastic formation and diffusion bonding comprises applying a forming pressure within the pack to expand the pack within the die; and supplying gas between the die and the pack to apply a back pressure around an outside of the pack while the pack is being expanded to counteract the forming pressure to reduce surface mark off.

9 Claims, 5 Drawing Sheets

(56) References Cited

U.S. PATENT DOCUMENTS

| | | |
|---|---|---|
| 6,264,880 B1 | 7/2001 | Elmer et al. |
| 6,419,146 B1 | 7/2002 | Buldhaupt et al. |
| 6,571,450 B2 * | 6/2003 | Yajima ........................ 29/421.1 |
| 6,677,011 B2 | 1/2004 | Elmer et al. |
| 2006/0000873 A1 * | 1/2006 | Arnold et al. ................. 228/118 |
| 2006/0005594 A1 * | 1/2006 | Franchet et al. ................. 72/61 |
| 2006/0210821 A1 | 9/2006 | Eilert et al. |
| 2007/0102494 A1 * | 5/2007 | Connelly et al. .............. 228/157 |
| 2009/0145192 A1 * | 6/2009 | Friedman et al. ................. 72/60 |

* cited by examiner

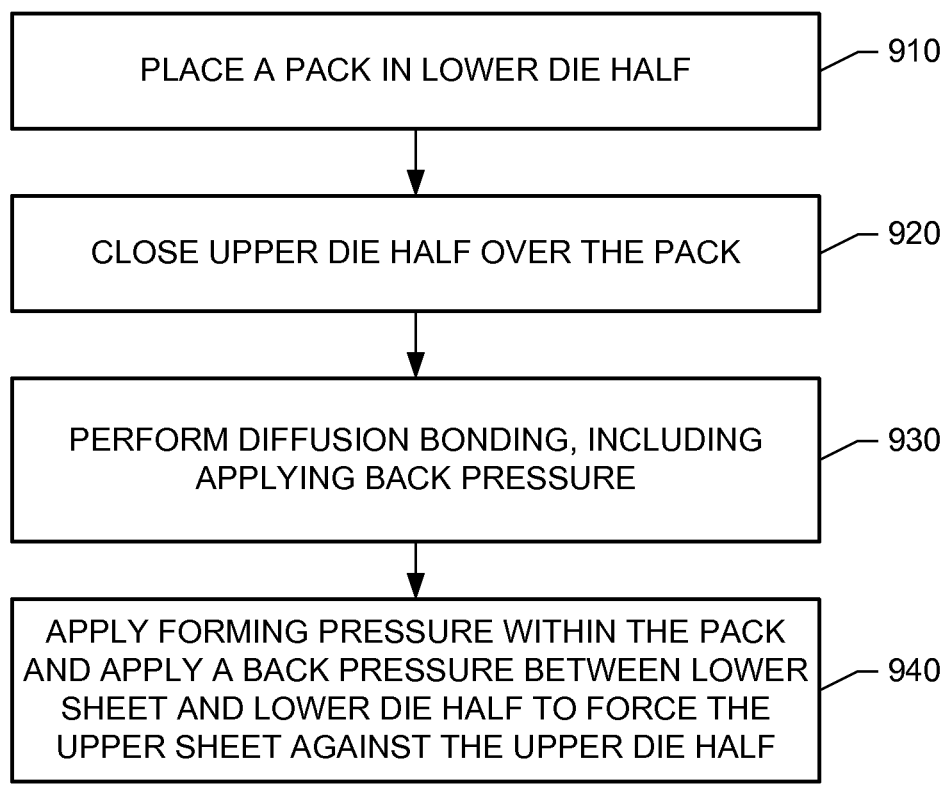

MARK-OFF SUPPRESSION IN SUPERPLASTIC FORMING AND DIFFUSION BONDING

This is a continuation-in-part of copending U.S. Ser. No. 11/393,114 filed Mar. 30, 2006.

BACKGROUND

Superplastic forming and diffusion bonding (SPF/DB) may be used to form monolithic metal structures having complex shapes and deep drawn features. For example, SPF/DB may be used to form exterior assemblies of aircraft.

Structures formed by SPF/DB may exhibit "surface mark-off." Surface mark-off is a marring of the surface of the formed structure. It may appear as a crease or other surface defect that interrupts the smoothness of the surface. Surface mark-off can not only be cosmetically unsightly, but can have other consequences. For instance, surface mark off on the outer-surface of an exterior aircraft assembly may increase aerodynamic drag.

It would be desirable to suppress surface mark-off in SPF/DB structures.

SUMMARY

According to an embodiment herein, a method of forming a pack in a die by superplastic formation and diffusion bonding comprises applying a forming pressure within the pack to expand the pack within the die; and supplying positive gas pressure between the die and the pack while the pack is being expanded in order to counteract the forming pressure to suppress surface mark off.

These features and functions may be achieved independently in various embodiments or may be combined in other embodiments. Further details of the embodiments can be seen with reference to the following description and drawings.

BRIEF DESCRIPTION OF THE DRAWINGS

FIG. 9 is an illustration of a method of performing SPF/DB herein.

DETAILED DESCRIPTION

Figure 1:
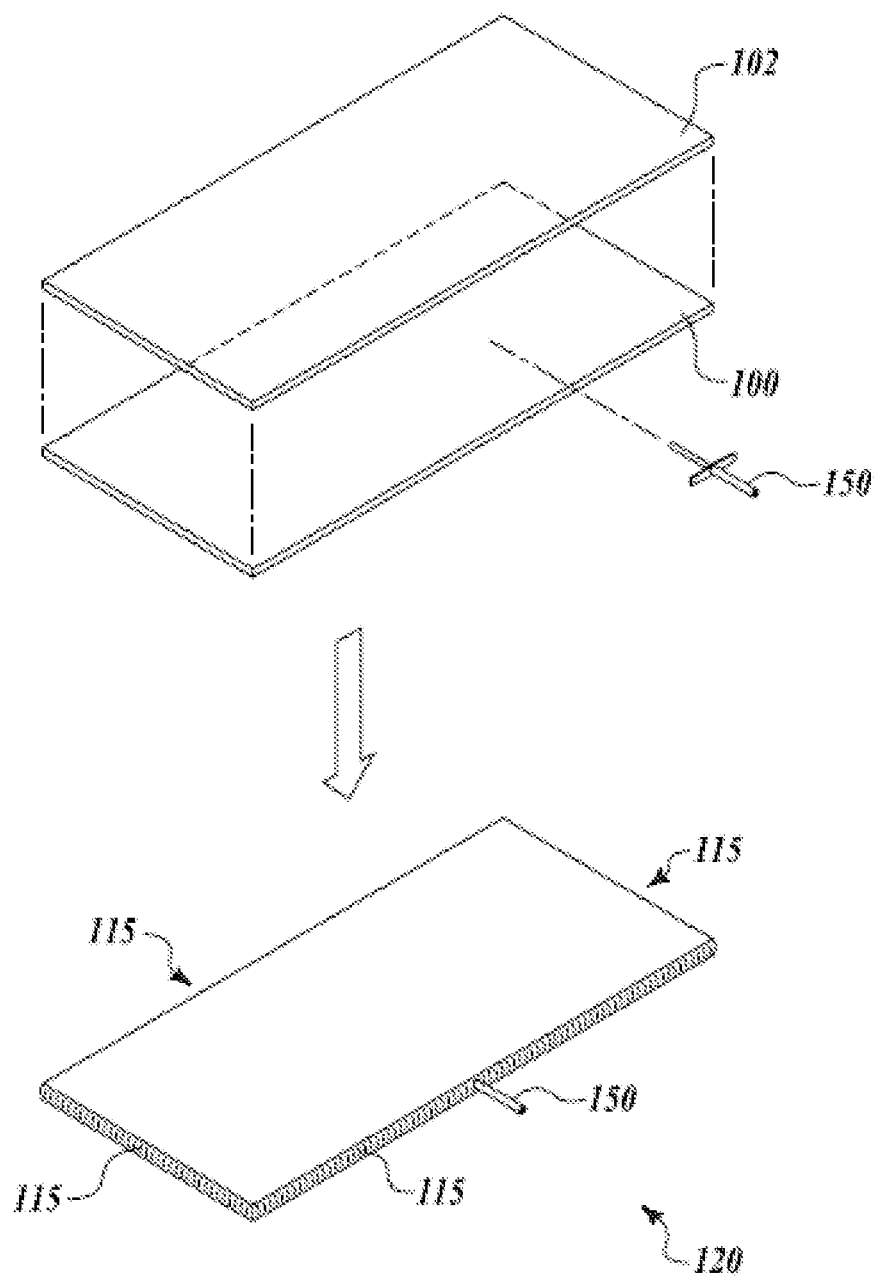
FIG. 1 is an illustration of a pack before and after diffusion bonding (DB) herein, but prior to superplastic forming.

FIG. 1 illustrates a two sheet pack 120 before and after its sheets 100, 102 are welded together and diffusion bonded. A weld 115 may be formed at regions in the vicinity of the perimeters of the sheets 100, 102 in a fusion weld or resistance, or laser, or electron beam welding. A gas inlet tube 150 is inserted between the sheets 100, 102 so that its inner tube 152 (see FIG. 3) is in communication with the cavity or space (not shown) formed between the two sheets 100, 102.

The sheets 100, 102 of the pack 120 are made of material that is diffusion bondable and superplastically formable. Examples include, but are not limited to, Inconel alloys, titanium, titanium aluminides, and titanium metal matrix composites.

Figure 2:
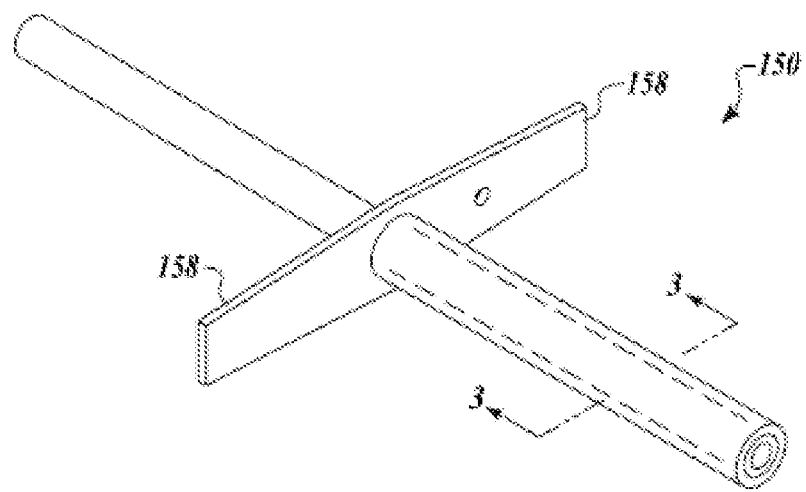
FIG. 2 is an illustration of a gas inlet tube for the pack.
Figure 3:
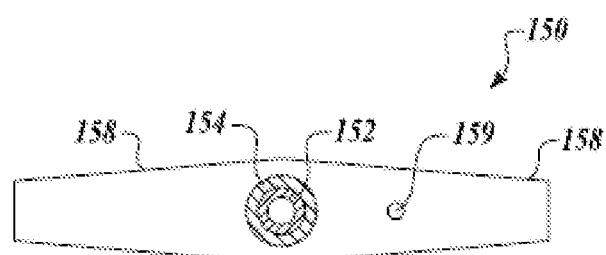
FIG. 3 is a cross sectional view of the tube of FIG. 2 taken at 3-3.

An embodiment of the gas inlet tube 150 is shown in FIGS. 2 and 3. The gas inlet tube 150 includes the inner tube 152 and an outer tube 154 as shown in FIG. 3. In addition, the gas inlet tube 150 has a pair of opposed outward extending wings 158 of suitable shape for sealing against the perimeter of the pack 120 in a gas tight seal. The outer tube 154 may be made of a superplastic material, and may be of the same material as the sheets of the pack 120 (e.g., Ti-6Al-4V, Ti-3Al-2.5V). This promotes sealing of the outer tube 154 to the pack 120 by welding, for example, to form a gas tight seal. The inner tube 152 may be made of a material that is substantially unaffected by heat and pressure conditions of SPF/DB. For example, the inner tube 152 may be of stainless steel, such as 304, 310, 316, 321, 347, Inconel alloys, and the like. This inner tube 152 will remain open to supply gas to the cavity inside the pack 120 during SPF/DB. The inner tube 152 will not collapse under pressure and temperature of SPF/DB while in the die. The wings 158 may be of any suitable material compatible for welding to the pack 120, and may be of the same material as the sheets 100, 102 of the pack 120. This facilitates welding of the wings 158 to the edge of the pack 120, and promotes a gas tight seal.

Figure 4:
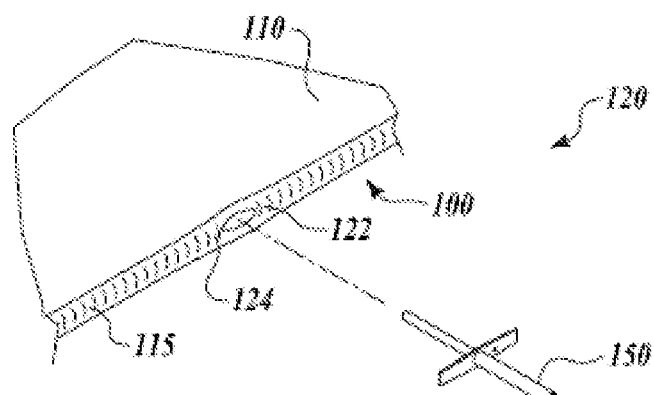
FIG. 4 is an illustration of the gas inlet tube juxtaposed for insertion into a receiving non-welded opening in the pack.
Figures 5A, 5B:
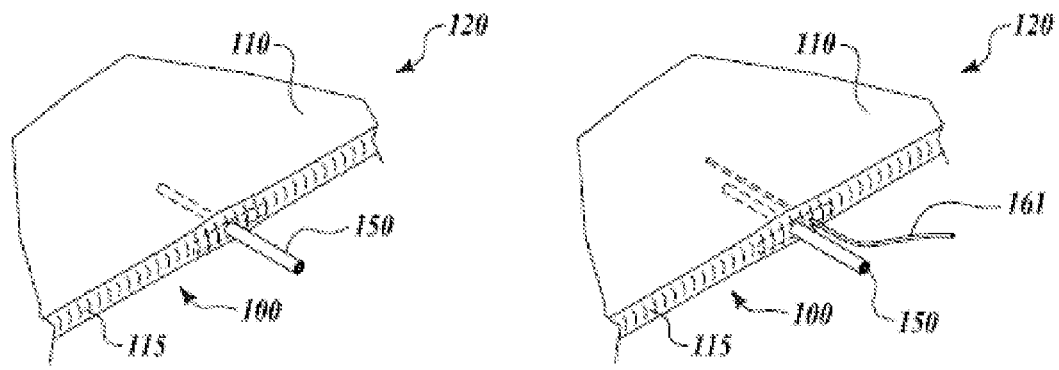
FIG. 5A is an illustration of the pack and a gas inlet tube welded in place.
FIG. 5B is an illustration of the pack and the gas inlet tube welded in place along with a temporary inert gas purge tube.

FIGS. 4 and 5 depict sections of the pack 120 around the gas inlet tube 150. In FIG. 4, the gas inlet tube 150 is juxtaposed for insertion into an unwelded space between the sheets 100, 102 of the pack 120. The wings 158 extend to cover edges 122, 124 of the pack 120 to ensure a gas tight seal when welded in place as shown in FIG. 5. In FIG. 5 the outer gas tube 154 is welded in place to the pack 120 and an end portion of the gas inlet tube 150 extends into the pack 120 for a short distance. In one embodiment, the wings 158 have a through hole 159 into which a small temporary tube 161 (see FIG. 5B) may be inserted and through which argon or other inert gas may be routed into the space between the sheets 100, 102 while the sheets 100, 102 are being welded into a pack 120. After welding, the temporary tube 161 is removed and the hole 159 is welded shut to seal off the pack 120, except for the open gas inlet tube 150.

Figure 6:
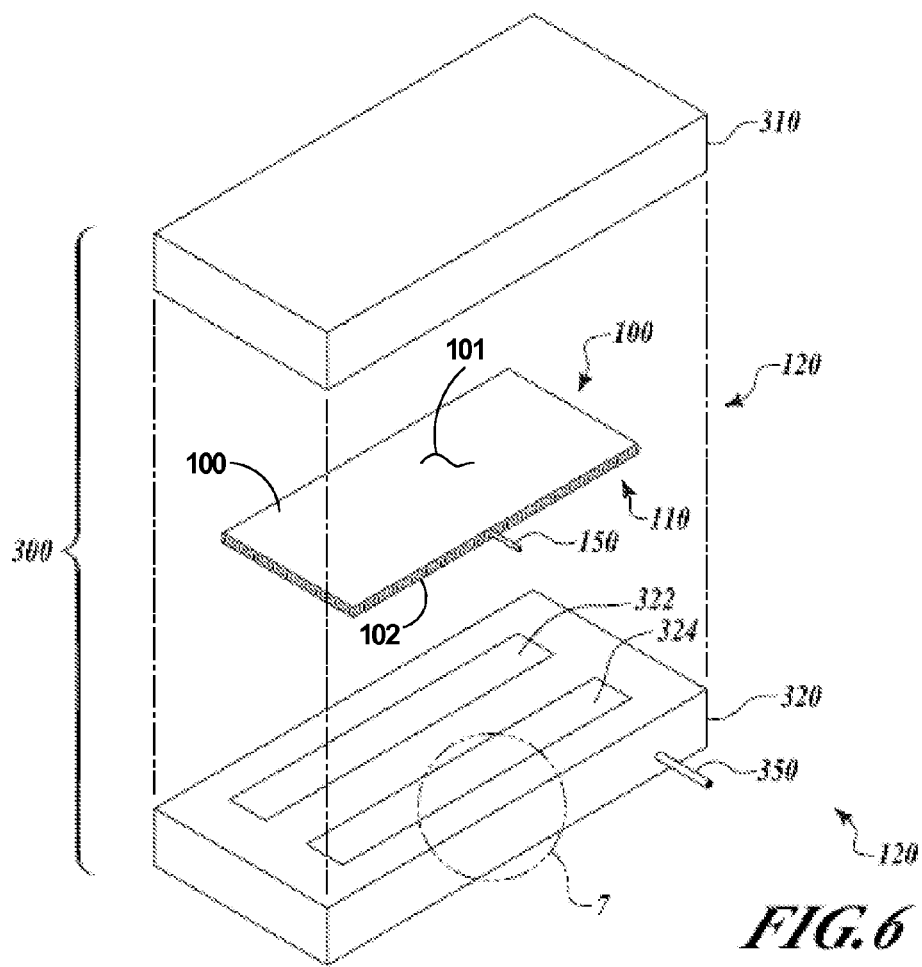
FIG. 6 is an illustration of a metal forming die with the pack inserted between die halves.

FIG. 6 shows the pack 120 and an example of a die 300 for forming an exterior aircraft assembly having an aero-smooth outer mold line (OML) surface and an inner mold line (IML) surface having stiffeners formed integrally therewith. In this example sheet 100 of the pack 102 will be referred to as the upper sheet 100, while sheet 102 will be referred to as the lower sheet 102. The die 300 has upper and lower die halves 310, 320. The upper die half 310 is configured to form an exterior surface 101 of the upper sheet 100 into the OML surface. The lower die half 320 is patterned with a pair of parallel cavities 322, 324 to form an exterior surface (not visible) of the lower sheet 102 into the IML surface.

Figure 7:
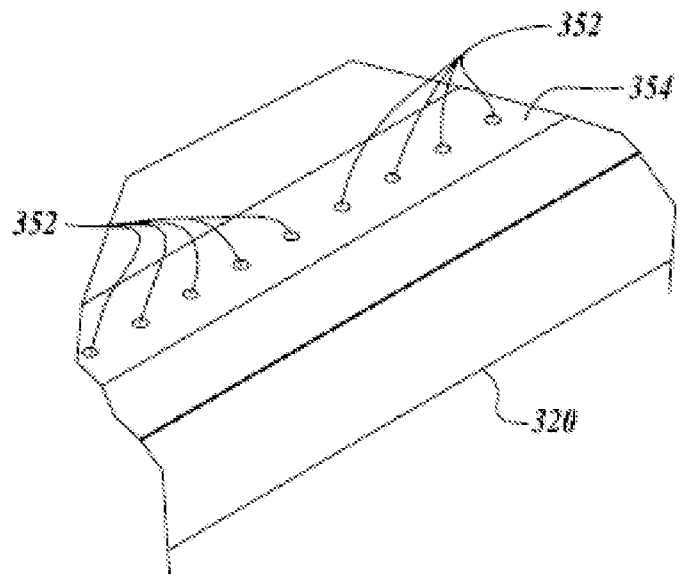
FIG. 7 is an illustration of an enlarged portion of the die half of FIG. 6 showing an example of die pressurizing gas inlet ports.

To provide a positive gas pressure (also referred to as the "back pressure") within the die 300 during superplastic forming, a back pressure gas inlet 350 supplies gas (e.g., argon) to the lower die half 320. The gas exits the lower die half 320 via a series of internal through bores 352 (shown in FIG. 7, an enlarged section of the lower die half 320). The gas exiting the bores 352 is directed towards the lower sheet 102 of the pack 120. As will be discussed below, the gas exiting the bores 352 creates a cushion of gas pressure that forces the pack 120 against the upper die half 310 during diffusion bonding and superplastic formation. The gas pressure may be distributed evenly across the entire die surface, including the die cavities 322, 324.

Figure 8:
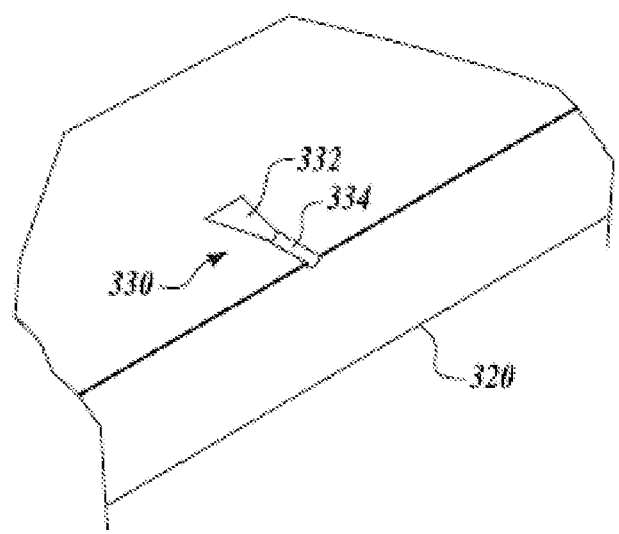
FIG. 8 is an illustration of a portion of the die half into which the inlet gas tube is inserted during SPF/DB herein.

FIG. 8 shows a section of the lower die half 320. The lower die half 320 has a receiving cavity 330 extending laterally across the die 300 at its peripheral edge. The receiving cavity 330 is sized to receive the gas inlet tube 150. In one embodiment shown here, the cavity 300 is funnel-shaped having a conical area 332 with a larger dimension inboard and an apex outboard. The trough 334 of the funnel shaped cavity 330 extends from the apex of the cone 332 to the outer edge of the die half 320. The receiving cavity 330 creates a gas tight seal between the die 300 and the gas inlet tube 150 so that the back pressure does not leak from between the die half 320 and the pack 120.

Reference is once again made to FIG. 6, and additional reference is made to FIG. 9, which illustrates a method of using the die 300 to fabricate an exterior aircraft panel via SPF/DB. At block 910, the pack 120 is placed in the lower die half 320, with the sheet 102 covering the cavities 322, 324 and the gas inlet tube 150 resting in the receiving cavity 330.

At block 920, the upper die half 310 is placed over the pack 120, and the die 300 is closed. For instance, the die 300 may be closed (and also opened) by a hydraulically-actuated forming press. With the die 300 closed, the tip of gas inlet tube 150 extends out from between the die halves 310, 320 and a gas supply may be attached to it to supply pressurized gas. In closing the die 300, the gas inlet tube 150 is pressed into the receiving cavity 330 to form a gas tight seal. Prior to applying a back pressure, there may be space between the upper die half 310 and the upper sheet 100 of the pack 120.

At block 930, diffusion bonding is performed on the pack 120. Portions of the sheets 100, 102 that are not treated with a stop-off material are joined. While maintaining a vacuum (approximately −14.5 psi at sea level) between the sheets 100 and 102 via the gas inlet tube 150, a back pressure is applied by pressurizing the lower die half 320 via the gas tube 350. In some embodiments, the back pressure may be between 100 and 600 psi. In addition, a gas tight seal around the gas inlet tube 150 is formed.

At block 940, after diffusion bonding has been performed, superplastic forming is performed. Positive gas pressure applied through the lower die half 320 via the gas tube 350 is substantially reduced so the back pressure will be below the forming pressure. Then, a positive gas pressure (the forming pressure) is applied (via the gas port 150) between the upper and lower sheets 100, 102. The back pressure forces the upper sheet 100 against the upper die half 310, while the forming pressure causes the lower sheet 102 to form into the cavities 322, 324. The press that closes the die 300 may apply tonnage to counteract the force of the forming pressure within the pack 120.

Temperatures for superplastic forming vary depending upon specific properties of the sheets: alloy composition and crystalline structure, for example. Typically however, temperatures in the range from about 1400 to about 1750° F. are useful for titanium alloys, but other temperatures may be better suited to certain alloys.

During the superplastic forming, the back pressure is less than the forming pressure. For instance, if the forming pressure is 50 psi, the back pressure may be 25 psi. If the forming pressure is between about 200 and 600 psi, the back pressure may be about 100 to about 500 psi less than the forming pressure.

In some embodiments, the back pressure may be reduced as the pack 120 is being formed. As but one example, the forming pressure and back pressure start at 300 psi and 200 psi, respectively. As the lower sheet 200 is being formed in the cavities 322, 324, the back pressure is gradually reduced to 100 psi.

As the pack 120 is being expanded, the gas supplied to the back pressure inlet tube 350 creates a pressure cushion between the lower sheet 102 and the lower die half 330. The positive gas pressure coming in through gas tube 350 places positive pressure on upper sheet 100 (transferred by its intimate contact with lower sheet 102), thus causing the upper sheet 100 to be forced against the surface of the upper die half 310 throughout the superplastic forming. Without the pressure cushion, the forming pressure inside the pack 120 would force the sheet 102 to fill the troughs 322, 324, but in the process, the sheet 100 would move away from the upper die 310 (that is, move sympathetically with the sheet 102), whereby mark-off would occur. By creating the pressure cushion, the lower sheet is allowed to form into the cavities 322, 324, but the upper sheet 100 is forced against the surface of the upper die half 310 and thereby prevented from moving sympathetically with the sheet 102. Consequently, surface mark off is suppressed while lower sheet 102 is being formed, and the OML surface of the exterior aircraft assembly has a defect-free, aero-quality finish.

The invention claimed is:

1. A method of forming a pack in a die by superplastic formation and diffusion bonding, the method comprising:
   applying a forming pressure within the pack to expand the pack within the die; and
   supplying positive gas pressure between a first portion of the die and an exterior of the pack while the pack is being expanded to force a sheet of the pack into contact against a surface of a second portion of the die as the pack is being expanded,
   wherein the die includes a receiving cavity comprising a funnel shape having a funnel mouth inboard and a cylindrical trough extending from an apex of the funnel shape to an outer edge of the die, and wherein applying the forming pressure within the pack to expand the pack within the die includes supplying a gas to an interior of the pack via a gas inlet tube disposed in the receiving cavity of the die, wherein the receiving cavity creates a gas tight seal between the die and the inlet tube when the die is closed and the gas is supplied.

2. The method of claim 1, wherein the sheet is a first sheet that is formed into an outer mold line surface and the pack includes a second sheet that is formed into an inner mold line surface, and wherein the positive gas pressure impinges the first sheet against the second portion of the die to prevent the first sheet from moving sympathetically with the second sheet during superplastic forming.

3. The method of claim 2, wherein the pack is formed into an exterior aircraft panel.

4. The method of claim 1, wherein the forming pressure is at least 25 psi greater than the positive pressure while the pack is expanding within the die.

5. The method of claim 4 wherein the differential between the forming and positive pressures is in the range from about 100 to about 500 psi.

6. The method of claim 1, further comprising performing diffusion bonding prior to applying the forming pressure, wherein the sheet is an upper sheet of the pack; wherein the diffusion bonding includes maintaining a vacuum between the upper sheet and a lower sheet of the pack; wherein the first portion of the die is a lower portion of the die and the second portion of the die is an upper portion of the die; and wherein the positive pressure is applied between the lower portion of the die and an exterior of the lower sheet to force the upper sheet against the upper portion of the die as the forming pressure is being applied.

7. The method of claim 1, wherein the sheet is an upper sheet of the pack, wherein the first portion of the die is a bottom portion of the die and the second portion of the die is an upper portion of the die, the pack interposed between the upper portion of the die and the bottom portion of the die, wherein a cavity is defined between a lower sheet of the pack and the bottom portion of the die, and wherein the positive pressure is applied between the bottom portion of the die and the lower sheet of the pack to urge the upper sheet against the upper portion of the die as the lower sheet is being expanded into the cavity.

8. The method of claim 7, further comprising reducing the positive pressure applied between the bottom portion of the die and the lower sheet of the pack as the lower sheet is being expanded into the cavity.

9. The method of claim 1, wherein the die includes at least two cavities recessed into the first portion of the die, and wherein the pack expands into the at least two cavities responsive to the supplying the gas to the interior of the pack.

* * * * *